US009856998B2

(12) United States Patent
Cripps, II (10) Patent No.: US 9,856,998 B2
(45) Date of Patent: *Jan. 2, 2018

(54) MULTIPLE AXIS CONTROL SUSPENSION SYSTEM AND METHOD

(71) Applicant: Louis Cripps, II, Castle Rock, CO (US)

(72) Inventor: Louis Cripps, II, Castle Rock, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/384,814

(22) Filed: Dec. 20, 2016

(65) Prior Publication Data

US 2017/0102099 A1 Apr. 13, 2017

Related U.S. Application Data

(62) Division of application No. 14/016,752, filed on Sep. 3, 2013, now Pat. No. 9,534,708.

(60) Provisional application No. 61/696,504, filed on Sep. 4, 2012.

(51) Int. Cl.
 *F16L 3/22* (2006.01)

(52) U.S. Cl.
 CPC .............. *F16L 3/221* (2013.01); *F16L 3/22* (2013.01); *F16L 3/222* (2013.01)

(58) Field of Classification Search
 CPC ... H02G 3/263; H02G 3/32; F16L 3/22; F16L 3/221; F16L 3/222; F16L 3/23; F16L 3/01; F16L 3/08; F16L 3/12; F16L 7/00; Y10T 24/3439; Y10T 24/3444; Y10T 403/7129; Y10T 403/7135; Y10T 403/7141

USPC ..... 248/49, 51, 62, 63, 68.1, 79; 174/40 CC, 174/68.1, 68.3, 72 A, 40 R, 88 R, 95; D8/356; 403/389, 390, 391

See application file for complete search history.

(56) References Cited

U.S. PATENT DOCUMENTS

| 1,856,109 A | 5/1932 | Joseph et al. |
| 2,683,578 A | 7/1954 | Rainey |
| 2,888,546 A | 5/1959 | Kinney |
| 3,383,459 A | 5/1968 | Herbert |
| 3,397,431 A | 8/1968 | Walker |
| 3,590,854 A | 7/1971 | Cork |
| 4,306,620 A | 12/1981 | Fronius |
| 4,420,016 A | 12/1983 | Nichols |
| 4,421,945 A | 12/1983 | Moisson |
| 4,582,281 A | 4/1986 | Van Camp |
| 4,658,577 A | 4/1987 | Klein |
| 4,705,243 A | 11/1987 | Hartmann et al. |

(Continued)

FOREIGN PATENT DOCUMENTS

WO 2000/079660 12/2000

*Primary Examiner* — Stanton L Krycinski
*Assistant Examiner* — Guang H Guan
(74) *Attorney, Agent, or Firm* — Trenner Law Firm, LLC; Mark D. Trenner (57) ABSTRACT

A multiple axis control suspension system is disclosed. An example system includes at least one spine having a greater moment of inertia about a transverse centroidal axis than about a vertical centroidal axis. The example system includes at least one support member. A passage is formed through the at least one support member, the passage configured to receive the elongate spine. At least one receptacle is provided in the at least one support member, the at least one receptacle configured to receive at least one conduit such that a force acting on the conduit is transferred to the elongate spine.

19 Claims, 13 Drawing Sheets

(56) References Cited

U.S. PATENT DOCUMENTS

| | | |
|---|---|---|
| 4,784,462 A | 11/1988 | Priaroggia |
| 4,840,023 A | 6/1989 | Borsani |
| 5,007,605 A | 4/1991 | Horvath |
| 5,027,478 A | 7/1991 | Suhr |
| 5,251,373 A | 10/1993 | DeCarlo et al. |
| D358,545 S | 5/1995 | Price |
| 5,465,791 A | 11/1995 | Loitherstein |
| D375,888 S | 11/1996 | Loitherstein |
| 5,742,982 A | 4/1998 | Dodd et al. |
| D395,815 S | 7/1998 | Walters et al. |
| 5,776,277 A | 7/1998 | Wambeke |
| 5,900,586 A | 5/1999 | Carr |
| 5,908,072 A | 6/1999 | Hawkins |
| 6,433,282 B1 | 8/2002 | Traversa |
| 6,500,666 B1 | 12/2002 | Clements-Macak et al. |
| 6,515,229 B2 | 2/2003 | Aoki et al. |
| 6,552,270 B1 | 4/2003 | Heacox |
| 6,622,585 B1 | 9/2003 | Salomonsson et al. |
| 6,710,249 B1 | 3/2004 | Denton |
| D508,842 S | 8/2005 | Paolini |
| 7,500,644 B2 | 3/2009 | Naudet et al. |
| 7,883,361 B2 | 2/2011 | Ambo et al. |
| 8,020,811 B2 | 9/2011 | Nelson |
| 8,240,620 B2 | 8/2012 | Walter |
| 8,316,514 B2 | 11/2012 | Sano |
| 8,378,214 B2 | 2/2013 | Ambo |
| 9,488,297 B1 * | 11/2016 | Schrader .................. F16L 3/12 |
| 9,520,705 B2 * | 12/2016 | Trifeletti ................ H02G 13/40 |
| 9,534,708 B2 * | 1/2017 | Cripps, II ............... F16L 3/222 |
| 9,692,220 B2 * | 6/2017 | Schrader ............. H02G 15/007 |
| 2003/0173470 A1 | 9/2003 | Geiger |
| 2007/0246613 A1 | 10/2007 | Kennedy |
| 2009/0084581 A1 | 4/2009 | Johnson |
| 2009/0146019 A1 | 6/2009 | Choi |
| 2009/0272576 A1 | 11/2009 | Medina |
| 2010/0003889 A1 | 1/2010 | Greenley et al. |
| 2011/0042529 A1 | 2/2011 | Walter |
| 2011/0232219 A1 | 9/2011 | Wilkinson, Jr. |
| 2013/0187012 A1 | 7/2013 | Blakeley et al. |
| 2014/0061393 A1 | 3/2014 | Cripps |

* cited by examiner

MULTIPLE AXIS CONTROL SUSPENSION SYSTEM AND METHOD

PRIORITY CLAIM

This application is a divisional of U.S. patent application Ser. No. 14/016,752 filed on Sep. 3, 2013 titled "Multiple Axis Control Suspension System and Method" of Louis Cripps, which claims the priority filing date and benefit of U.S. Provisional Patent Application No. 61/696,504 filed on Sep. 4, 2012 titled "Multiple Axis Control Suspension System and Method" of Louis Cripps, each hereby incorporated by reference in its entirety as though fully set forth herein.

BACKGROUND

Conduits, such as wires, cables, and hoses are often connected between two locations or terminals. For example, a wire may be connected between a power source (e.g., an outlet) and a device that is being powered. Or for example, cables (e.g., fiber optic cables, computer cabling, and the like) may be connected between two or more devices or entities to provide a data connection. In another example, hoses may be connected between a source and a drain, container, or other destination for fluid carried in the hose.

In many applications, (e.g., electrical and hydraulic connection of train cars) the distance between two terminals may be subject to future increase, decrease or both. To provide for an increase in distance between two terminals, a length of conduit is used which is greater than the starting distance between the two terminals. This excess length may result in conduit slack.

Slack of electrical wiring may cause a short resulting in electrical hazards. Data flow over cables may be interrupted if the cables become damaged by undesired contact with the ground or other foreign surfaces. If slacking towards the ground, hoses can damage moving equipment parts. Preventing slacking, drooping or sagging of conduits reduces the potential for hazards and equipment damage but often results in reduced range of movement of the conduits.

DETAILED DESCRIPTION

Multiple axis control suspension systems and methods of using the same are disclosed. In an example, a system includes a plurality of support members and at least one spine configured to receive the support members. The system may be used to change the direction of slack, for example, in applications where high-flex cables, wires or hoses are connected between two moving parts. Thus, undesired contact of these conduits with foreign objects may be reduced or altogether prevented.

A multiple axis control suspension system allows for freedom of movement along one axis, while restricting movement in a different direction to provide support and strength. When slack is displaced outside of the vertical plane, for example, into the horizontal plane, additional length of wire, cable or hose can be provided as-needed for connection of fixed-to-fixed, fixed-to-moving, and/or moving-to-moving components. With slack displaced outside of the vertical plane, additional length does not sag or droop under the force of gravity. Thus, conduits may be kept out of harm's way.

Before continuing, it is noted that as used herein, the terms "includes" and "including" mean, but is not limited to, "includes" or "including" and "includes at least" or "including at least." The term "based on" means "based on" and "based at least in part on."

Figure 1:
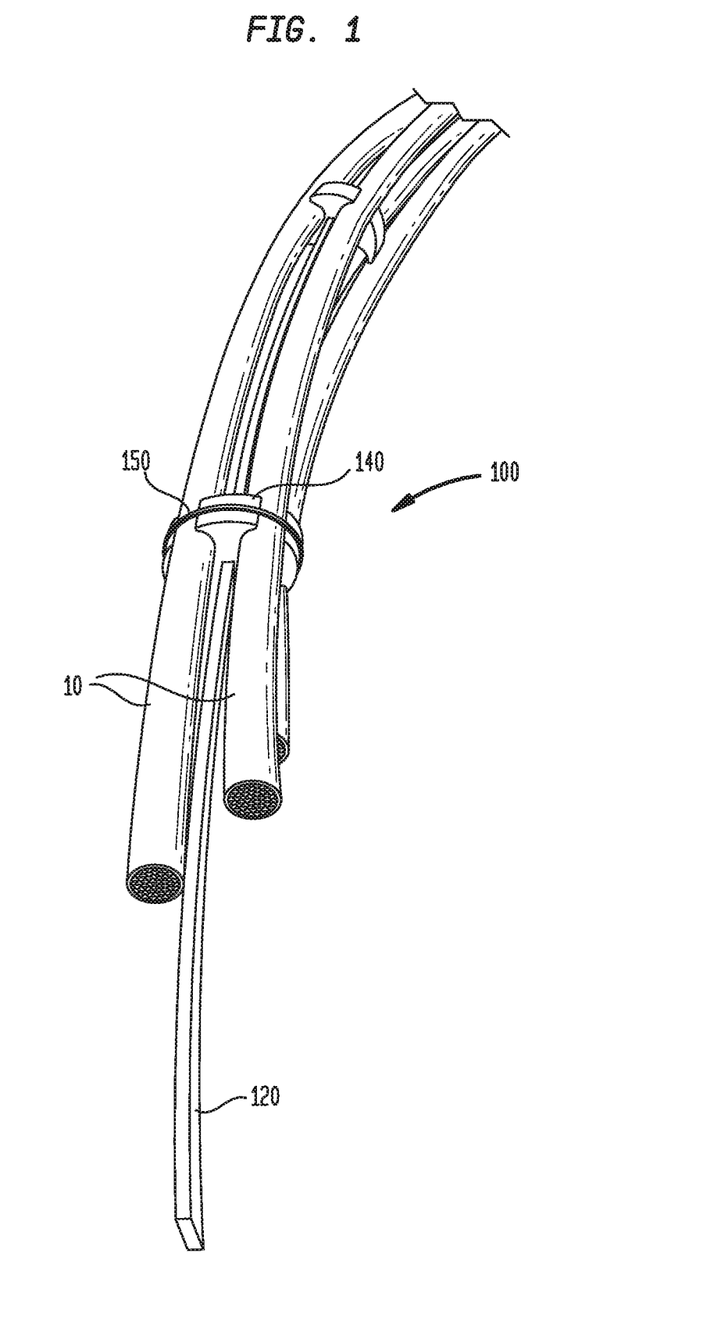
FIG. 1 illustrates a perspective view of an example multiple axis control suspension system.
Figure 2:
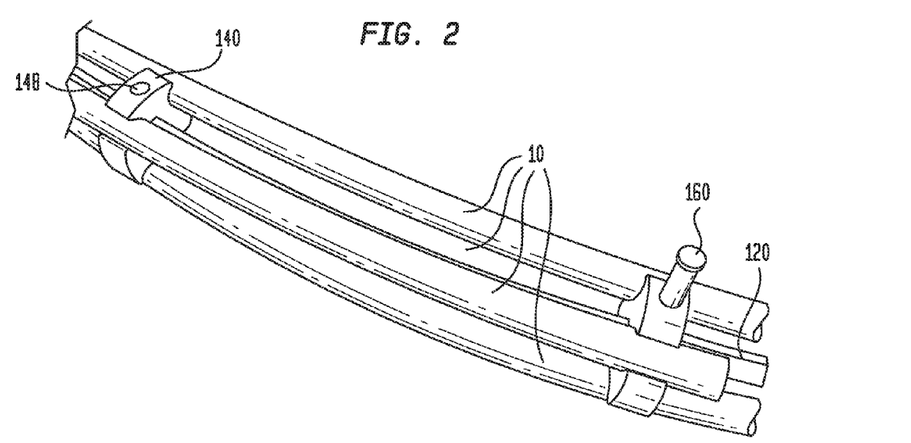
FIG. 2 illustrates another perspective view of an example multiple axis control suspension system.
Figure 3:
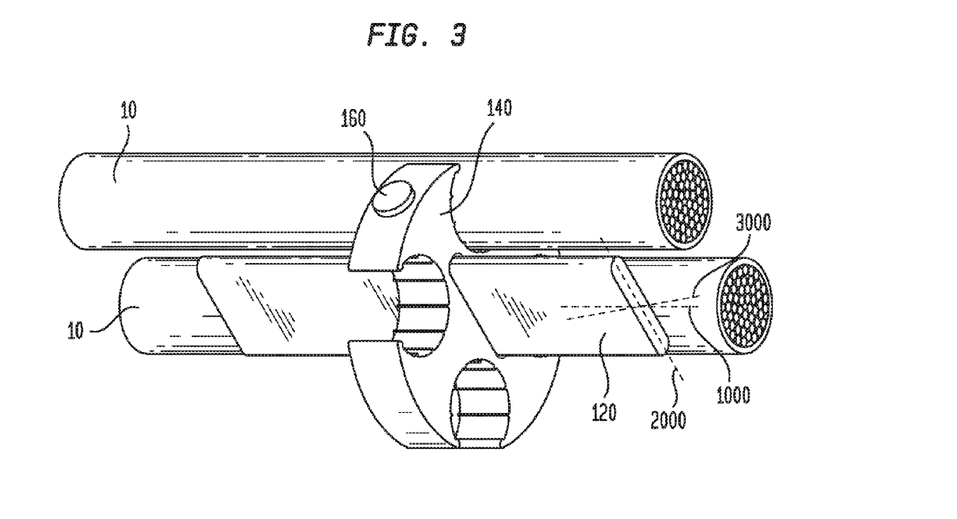
FIG. 3 illustrates a detail view of an example support member of an example multiple axis control suspension system.

FIGS. 1-3 illustrate an example multiple axis control suspension system 100. The multiple axis control suspension system 100 may include an elongate spline or spine 120, and a plurality of support members 140.

Elongate spine 120 may provide greater flexibility about a vertical centroidal axis 2000 than about transverse 3000 and longitudinal 1000 centroidal axes. For example, elongate spine 120 may have a greater moment of inertia about transverse centroidal axis 3000 than about vertical centroidal axis 2000 or longitudinal centroidal axis 1000. As such, the elongate spline 120 resists a greater bending moment about the transverse centroidal axis 3000 than about the vertical centroidal axis 2000.

It is noted that the maximum or yield bending moment of system 100 can be varied by spine material variation and flexibility of spine 120 can be adjusted by varying support member frequency.

Support members 140 (see e.g., FIGS. 3-4) may be configured to receive elongate spine 120 through passages 143. Passages 143 may take any of a variety of cross-sectional shapes including but not limited to rectangular. In addition, passages 143 may be central and/or offset in the support members 140. Each support member 140 includes a plurality of receptacles 146 configured to receive wires, cables, hoses or other similar conduits 10 such that a downward-acting force on conduits 10 is transferred through the support members 140 to the elongate spine 120. Receptacles 146 open toward an exterior and may include a plurality of teeth or other friction modifying (e.g., friction reduction) members 147.

Figure 5:
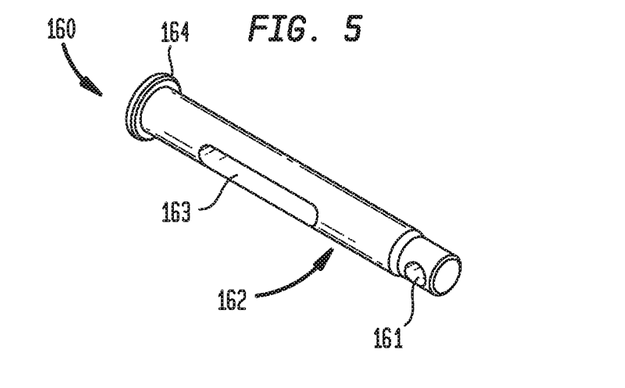
FIG. 5 illustrates a perspective view of an example pin of an example multiple axis control suspension system.

Support members 140 include a transverse through-bore 148 configured to receive a pin 160. With reference to FIG. 5, pin 160 comprises a head 164 and a shaft 162 including two transverse through-bores 161 and 163. Through-bore 163 may be elongate and configured to receive the spine as a through-slot. Through-bore 161 may be circular and configured to receive a cotter pin or the like to hold pin 160 in place.

It should be noted that some support members 140 may be provided without a transverse through-bore. Support members 140 may be discs with a roughly circular perimeter. However, any of a variety of shapes may be advantageously used. By way of further illustration, see FIGS. 15-17 and 20-21.

Figure 20:
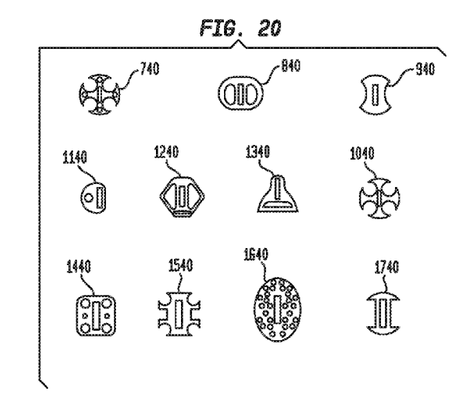
FIGS. 20-21 illustrate front views of example support members.

In an example, FIG. 20 illustrates a generally square shaped support member 1440. In an example, FIG. 20 illustrates a generally oval shaped support member 1640. In an example, FIG. 20 illustrates a generally rectangular shaped support member 1540. In an example, FIG. 20 illustrates a generally non-circular shaped support member 1440.

A constraining band 150 (FIG. 1) may be configured to surround the perimeter of one of the support members 140 to hold conduits 10 within open receptacles 146. In some example systems, constraining band 150 is configured to be received by circumferential grooves provided in support members 140.

Figures 6, 6A:
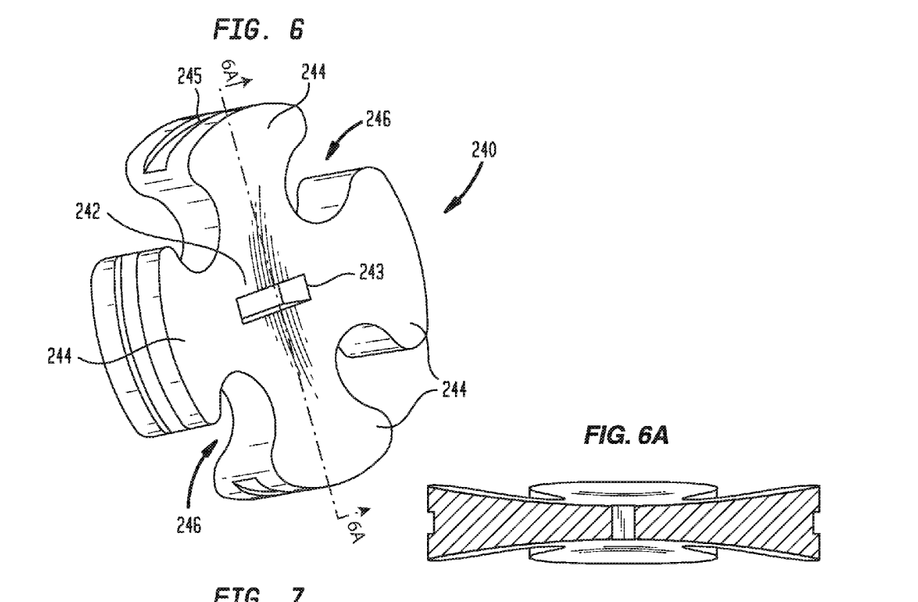
FIG. 6 illustrates a perspective view of another example support member of an example multiple axis control suspension system.
FIG. 6A illustrates a side cross sectional view of the example support member taken along lines 6-6 in FIG. 6.
Figure 7:
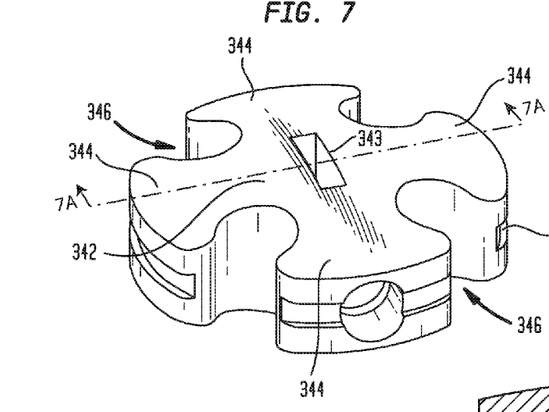
FIG. 7 illustrates a perspective view of yet another example support member of an example multiple axis control suspension system.
Figure 7A:
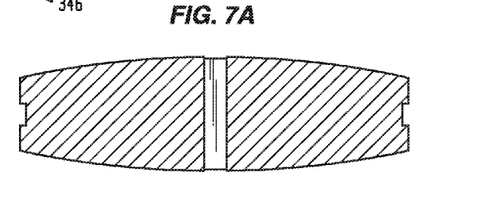
FIG. 7A illustrates a side cross sectional view of the example support member taken along lines 7-7 in FIG. 7.

In an example, support members may be constructed to have cooperating faces. With reference to FIGS. 6 & 7, female support members 240 are shown having a concave exterior surface 242 with negative curvature and male support members (see, e.g., FIG. 7) have a convex exterior surface 342 with positive curvature. Given similar radii of curvature, surfaces 242 are configured to mate with surfaces 342. The perimeter of support members 240 and 340 may take any of a variety of shapes including but not limited to roughly circular.

In an example, receptacles 246 and 346 open towards an exterior of the support members 240 and 340 and are configured to hold and support conduits 10. Passages 243 and 343 may take any of a variety of cross-sectional shapes including but not limited to rectangular. Circumferential grooves 245 and 345 are provided to accommodate, for example, a tie, clamp, band (or other mechanism) such as band 150. A transverse through-bore in support members 340 is configured to receive a pin such as pin 160.

Figure 8:
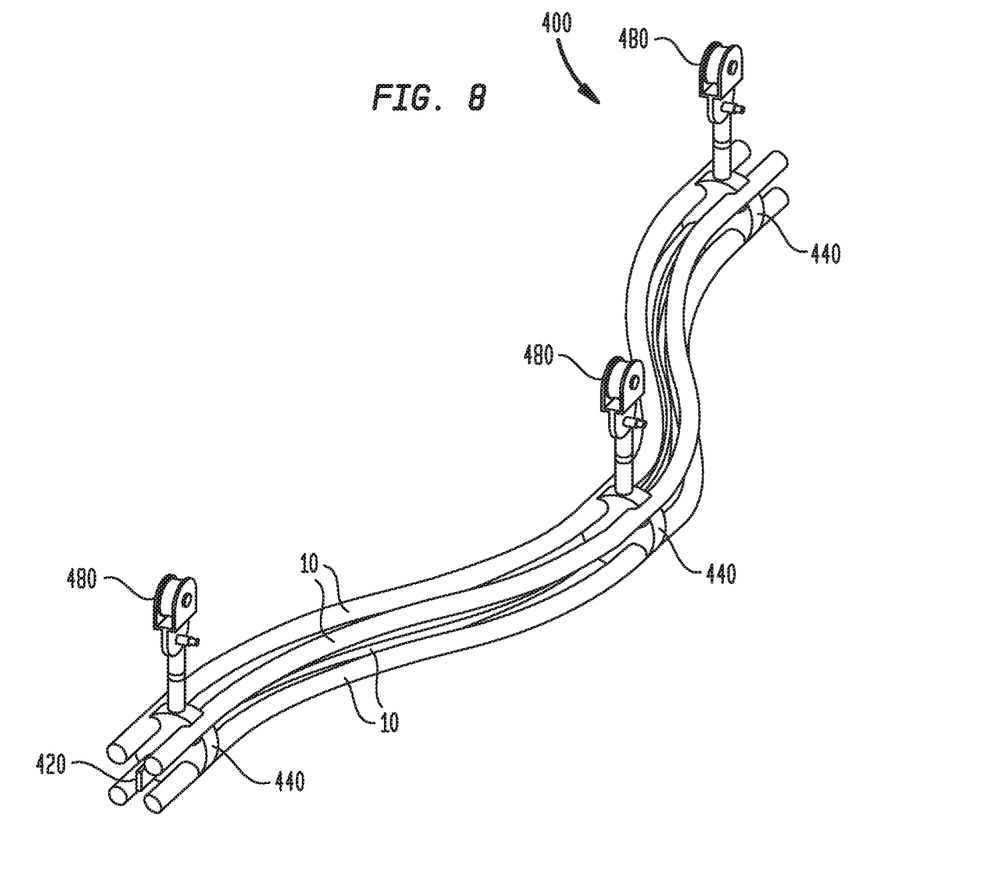
FIG. 8 illustrates a perspective view of another example multiple axis control suspension system.

FIG. 8 illustrates a perspective view of an example multiple axis control suspension system 400 including an elongate spline or spine 420, a plurality of support members 440 and a number of hangers 480 configured for coupling with selected support members to suspend system 400 from a support surface. It is noted that although hangers 480 are shown on each support member 440, hangers 480 do not need to be provided on each support member.

Support members 440 may include receptacles which open toward an exterior and are configured to hold and support conduits 10. Passages may be configured to receive the spine 420, and may take any of a variety of cross-sectional shapes including but not limited to rectangular. A transverse through-bore may be provided in support members 440 to receive a pin for facilitated coupling of hangers or supports 480 thereto.

Figure 9:
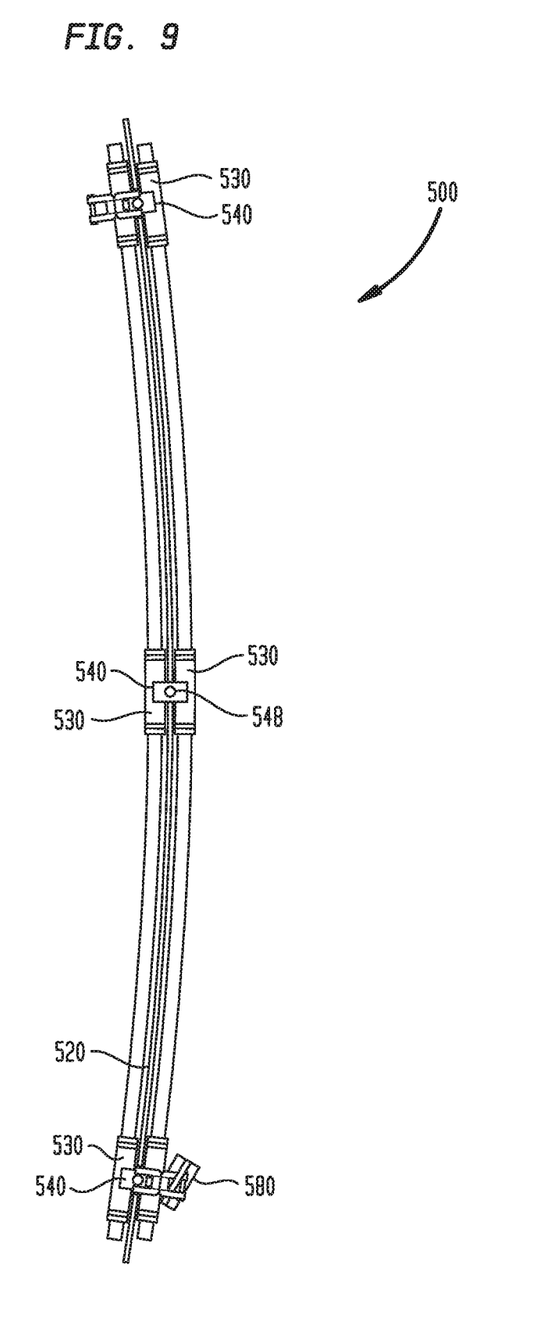
FIG. 9 illustrates a top view of yet another example multiple axis control suspension system.

FIG. 9 illustrates a top view of an example multiple axis control suspension system 500. Support members 540 are shown including receptacles which open towards an exterior and are configured to hold and support sleeves 530 and conduits 10. Passages configured to receive spine 520 may take any of a variety of cross-sectional shapes including but not limited to rectangular. It is also noted that the conduits 10 may be supported at the spine 120, at the support members 140, or at least partially at both.

Figure 9A:
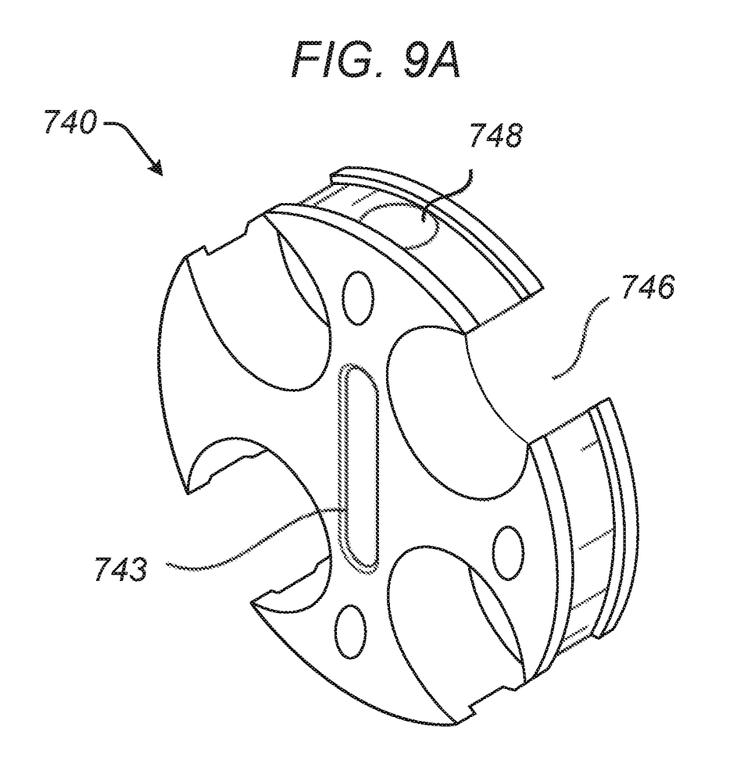
FIG. 9A illustrates a perspective view of an example support member.

FIG. 9A illustrates a perspective view of an example support member 740. In FIG. 9A, 700-series number refer to like components already described above for 100-series numbers, and therefore description may not be repeated for FIG. 9A. Support members 740 may be configured to receive elongate spine 120 through passage 743. Passage 743 may be central in the support members 740. Each support member 740 includes a plurality of receptacles 746 configured to receive wires, cables, hoses or other similar conduits 10 such that a downward-acting force on conduits 10 is transferred through the support members 740 to the elongate spine 120. Receptacles 746 open toward an exterior. Support members 740 include a transverse through-bore 748 configured to receive a pin 160 (FIG. 5).

A hanger 580 may be used to suspend the system 500 away from an adjacent surface (e.g., away from a floor, ceiling, and/or wall). In an example, the hangers 580 connect to the pin 160 and thus feed through the support member and around the spine via notch 163 (see, e.g., FIGS. 4-5). In another example, the hangers may attach directly to the spine and provide support via the spine. In another example, hangers may be attached to the spine and/or support members. It is noted that the system 100 may be supported from above (e.g., by hanging), from below (e.g., by the system 10 resting on a support or base), or at least partially from above and at least partially from below. The hanger 580 may also be implemented with stand-offs (e.g., the hanger for spacing the conduit from a ceiling and the stand-off for spacing the conduit from a side wall). The hangers 580, base, and/or stand-offs themselves are not limited to any particular configuration.

Figure 10:
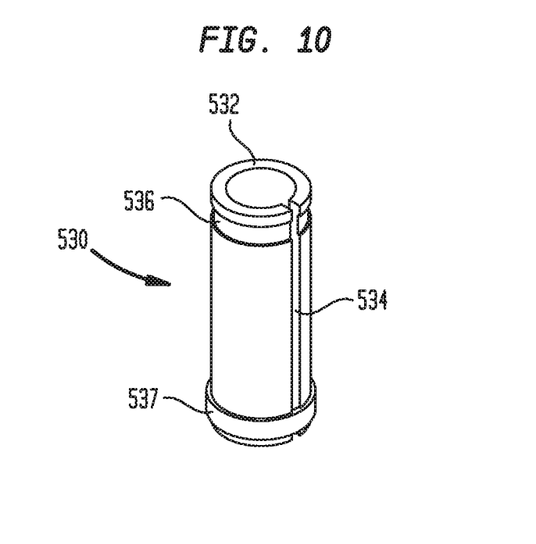
FIG. 10 illustrates a perspective view of an example sleeve usable with an example multiple axis control suspension system.

One or more bushing or sleeves 530 may be received in the receptacle(s) formed in the support members 540. In an example, sleeves 530 are shown in FIG. 10 each including a lumen 532 (e.g., a central lumen) and a longitudinal split 534 which opens the lumen 532 to a side. Sleeves 530 may assist in reducing wear on the conduit shielding or insulation. As described above, the longitudinal split allows for adjusting the cross section of the lumen. Sleeves 530 are configured to hold and support conduits 10 and may include an annular groove 536 configured to receive a compression band 537, clamp or other enclosure mechanism.

Figure 11A:
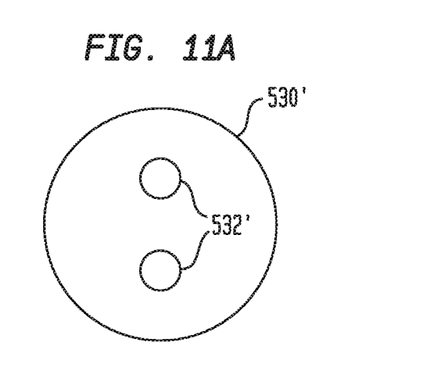
FIGS. 11A-B illustrate other cross-sections for the example sleeve or bushing.
Figure 11B:
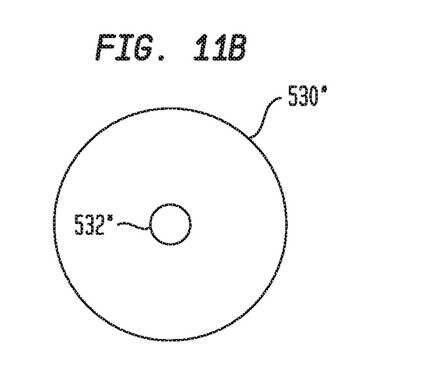

FIGS. 11A-B illustrate other cross-sections for the example sleeve or bushing (e.g., bushing 530 shown in FIG. 10). In an example shown in FIG. 11B, the bushing 530' may have a plurality of lumen 532' for receiving multiple conduits and maintaining the conduits in a fixed, spaced-apart relation to one another. In another example shown in FIG. 11B, the bushing 530" may include different size inner diameters of the lumen 532" to support different diameter conduit. Accordingly, the same support member may be used for different size and/or number of conduit by simply using a different bushing. Indeed, different bushings may be used in separate receptacles of the same support member. Other configurations are also contemplated.

Figure 4:
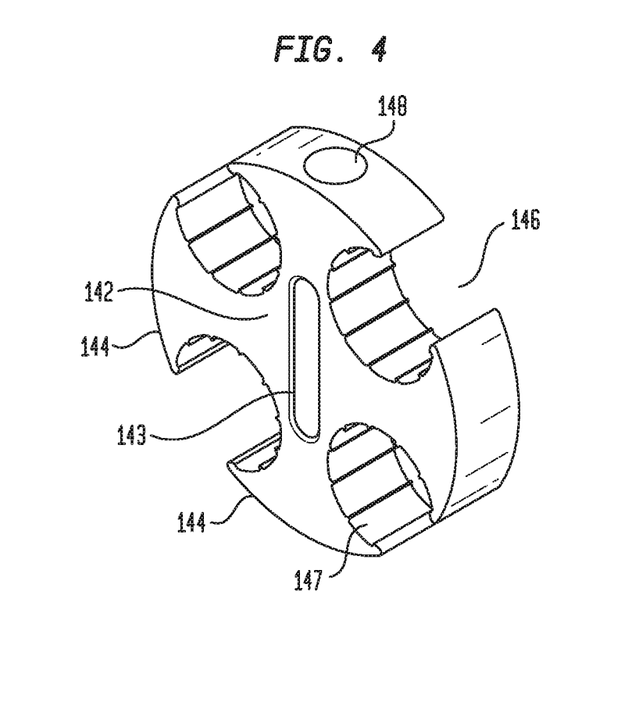
FIG. 4 illustrates a perspective view of an example support member.
Figure 12:
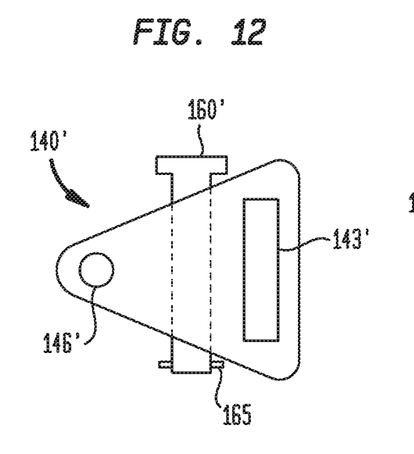
FIGS. 12-14 illustrate other plan views of the example support member.
Figure 13:
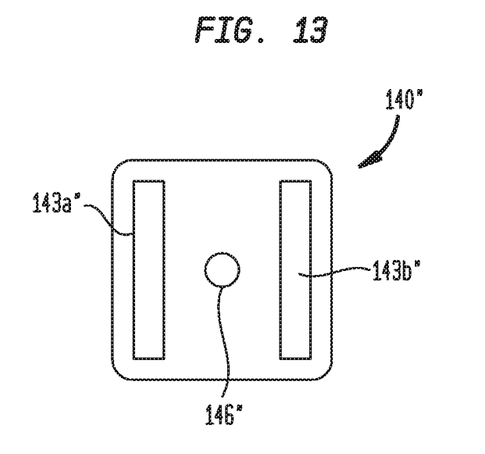
Figure 14:
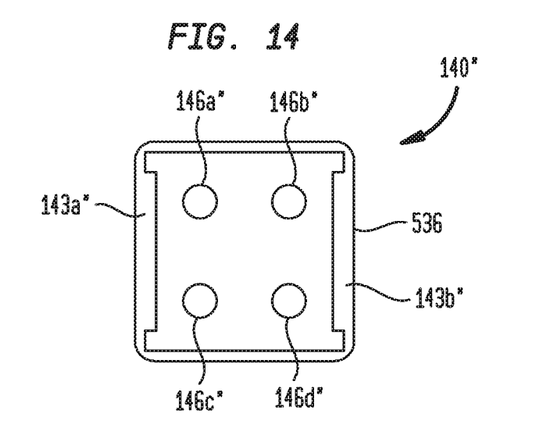

FIGS. 12-14 illustrate other plan views of the example support member (e.g., support member 140 in FIG. 4. These examples are provided by way of illustration. Other configurations are also contemplated.

In FIG. 12, the support member 140' is shown wherein the pin 160' for the hanger is between the receptacle 146' and the opening 143' for the spine. In this example, the pin 160' does not need opening 163 as shown in FIG. 5. FIG. 12 also illustrates pin 160' held in support member 140' by a cotter pin 165 (although other means for securing the pin 160' are contemplated).

In FIG. 13, the support member 140" is shown wherein the receptacle 146" is substantially central to the support member 140", and a plurality of openings 143a-b" (only two are illustrated, but more are possible) are provided for multiple spines.

In FIG. 14, the support member 140" is shown wherein a plurality of receptacles 146a-d" provided along with a plurality of openings 143a-b" (only two are illustrated, but more are possible) are provided on an outer perimeter for multiple spines. In this example, a band 536 may be provided to secure the spines to the support member 140".

Figure 15:
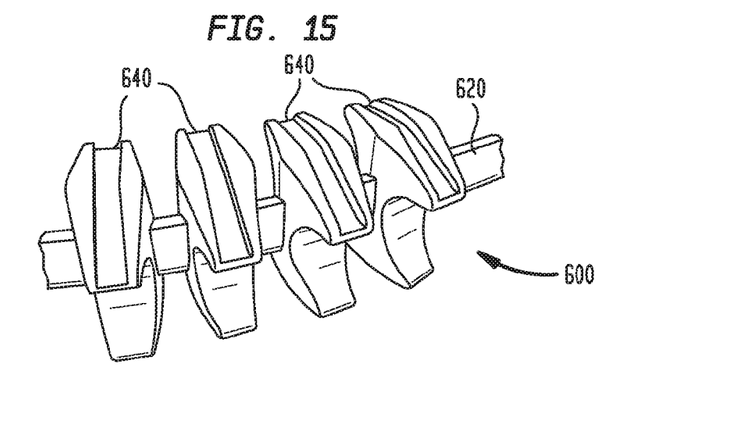
FIG. 15 illustrates a perspective view of another example multiple axis control suspension system with support members in a spaced apart configuration.
Figure 16:
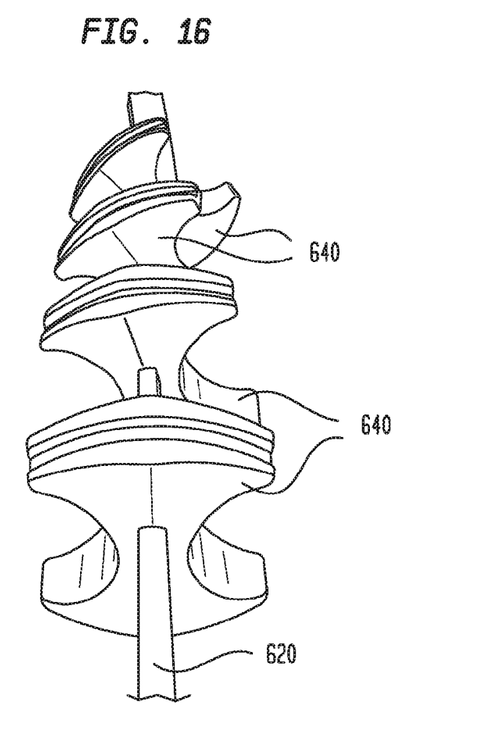
FIG. 16 illustrates a top view of an example multiple axis control suspension system with support members in a spaced apart configuration.
Figure 17:
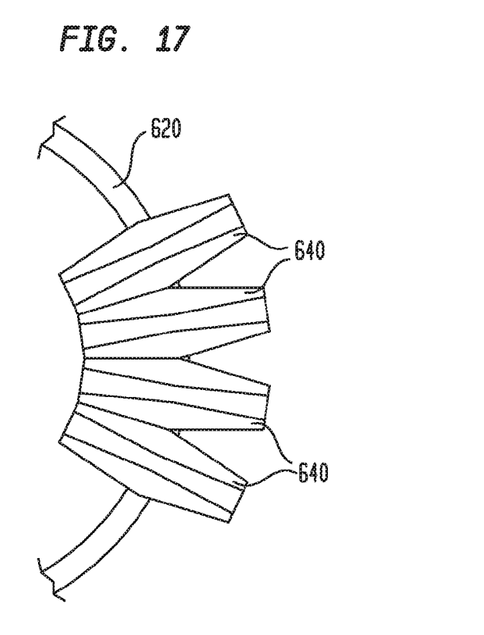
FIG. 17 illustrates a front perspective view of an example multiple axis control suspension system with support members in a closed configuration.

FIGS. 15-17 illustrate an example multiple axis control suspension system 600. In FIGS. 15-16, support members 640 are shown in a spaced apart configuration on spine 620. In FIG. 17, the support members 640 are shown in a close configuration. With support members 640 in a spaced apart relation, the flexibility of spine 620 is relatively high (e.g., as compared with the closely spaced relation shown in FIG. 17).

Support members 640 may include receptacles opening towards an exterior and configured to receive and support conduits 10. Circumferential grooves may be provided in support members 640, and are formed to receive a constraining band such as band 150 which is capable of surrounding the perimeter of one of the support members 640 to hold conduits 10 thereto. Support members 640 may also include a perimeter having circular arc inferior and superior portions. However, any of a variety of shapes may be advantageously used. For purposes of further illustration, see the examples in FIGS. 15-17 and 20-21.

Figure 18:
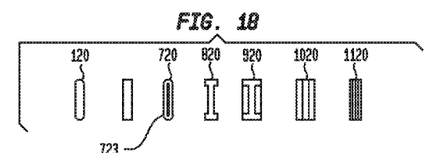
FIG. 18 illustrates cross-sectional views of example spines.

FIG. 18 illustrates cross-sectional views of a variety of different example spines. Spine 120 is shown having a rectangular cross section. Spine 720 is shown having an elliptical cross section and a longitudinal opening or lumen 723. Spine 820 is shown having an I-shape cross section. Spine 920 is shown having an alternate cross section. Spine 1020 is shown having a parallel cross-section. Spine 1120 is shown having an alternate parallel cross-section. Still other configurations are also contemplated.

Figure 19:
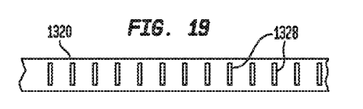
FIG. 19 illustrates a side view of an example spine.

Spine flexibility can be increased or decreased, for example, by machining patterns into the parallel sides. FIG. 19 illustrates a side view of an example spine 1320 having a plurality of spaced, transverse through-bores 1328 which may be provided to spine 1320 in any of a variety of shapes, sizes and frequencies. Still other configurations are also contemplated.

FIG. 20 illustrates front views of a variety of example support members. Support members 740, 940 and 1040 may have a roughly circular perimeter. Support members 840, 1640 and 1740 may have a roughly ovular perimeter. Support members 1140 and 1340 may have a roughly triangular perimeter. Support members 1440 and 1540 may have a roughly rectangular perimeter. Support members 1240 may have a roughly hexagonal perimeter. Support members 940, 1040, 1540 and 1740 include receptacles open to the exterior of their circumferences, while support members 840, 1140, 1240, 1340, 1440 and 1640 include closed receptacles. Support members 740 have both open and closed receptacles. Still other configurations are also contemplated.

In an example, some support members may include more than one passage configured to receive a spine. For example, a first passage may have a rectangular shape oriented in a first direction, and a second passage may have a rectangular cross section rotated 90 degrees with respect to the first passage.

Figure 21:
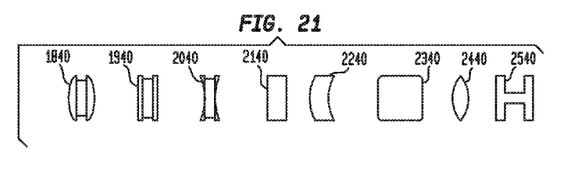

FIG. 21 illustrates side or profile views of a variety of different example support members. Support members 1840 are shown having first and second exterior faces with convex profiles. Support members 1940, 2140 and 2340 are shown having first and second exterior faces with flat or straight profiles. Support member 2040 is shown having first and second exterior faces with concave profiles. Support members 2240 and 2440 are shown having a first exterior face with a convex profile and a second exterior face with a concave profile. Support member 2540 is shown having a substantially H-shape. Still other configurations are also contemplated.

Figure 22:
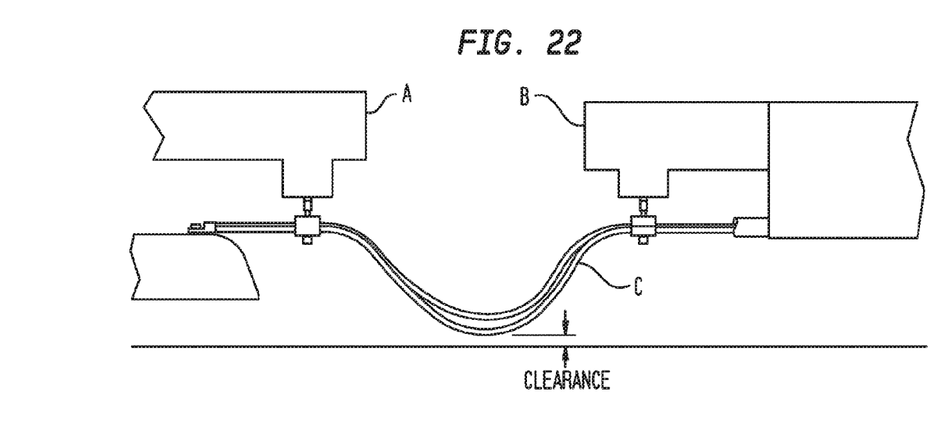
FIGS. 22-23 illustrate top and side views of a suspended cable.
Figure 23:
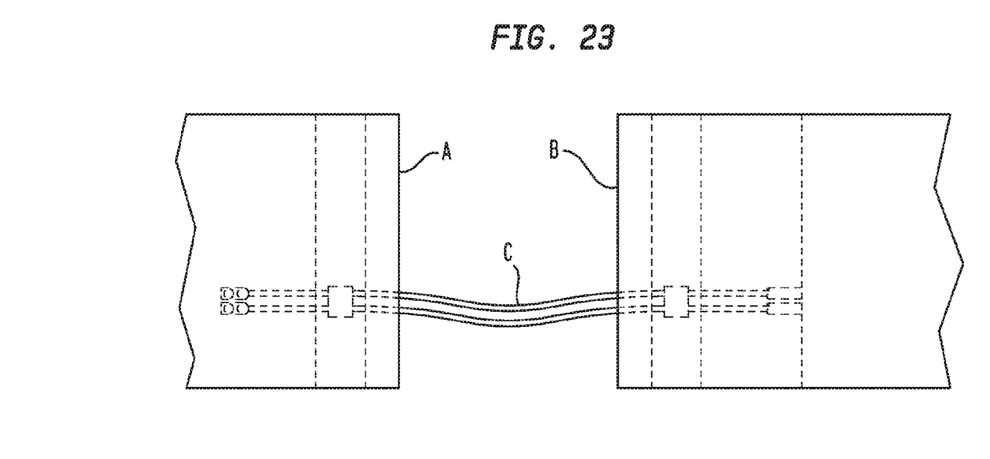

FIGS. 22-23 illustrate top and side views of a suspended cable. FIG. 22 illustrates a side view and FIG. 23 illustrates a top view showing a conduit suspended between terminals A and B. In an example where the distance between terminal A and terminal B may increase, a length of conduit C is provided which is greater than the starting distance between A and B. In many circumstances, the length of conduit C will be greater than the expected increased distance between terminals A and B (e.g., determined by a factor of safety (FOS)). Due to the extra length of conduit C provided, conduit C may slack toward the ground when the distance between terminals A and B is small as shown in FIG. 22, and remains within a vertical plane as shown in FIG. 23.

Figure 24:
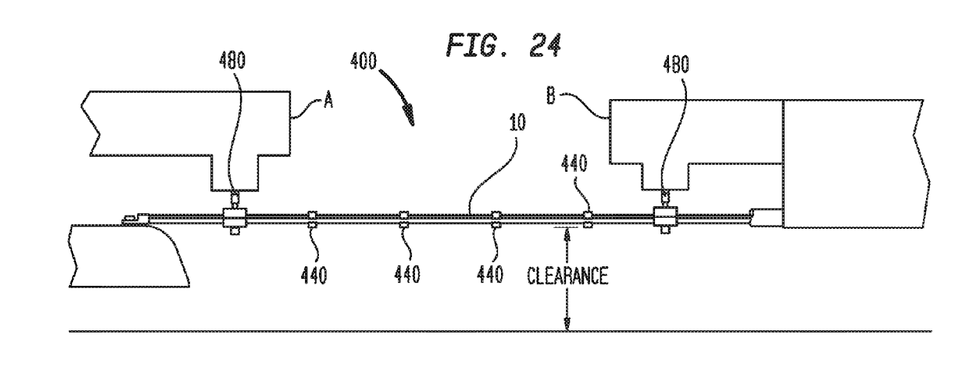
FIGS. 24-25 illustrate top and side views of a suspended cable using a multiple axis control suspension system.
Figure 25:
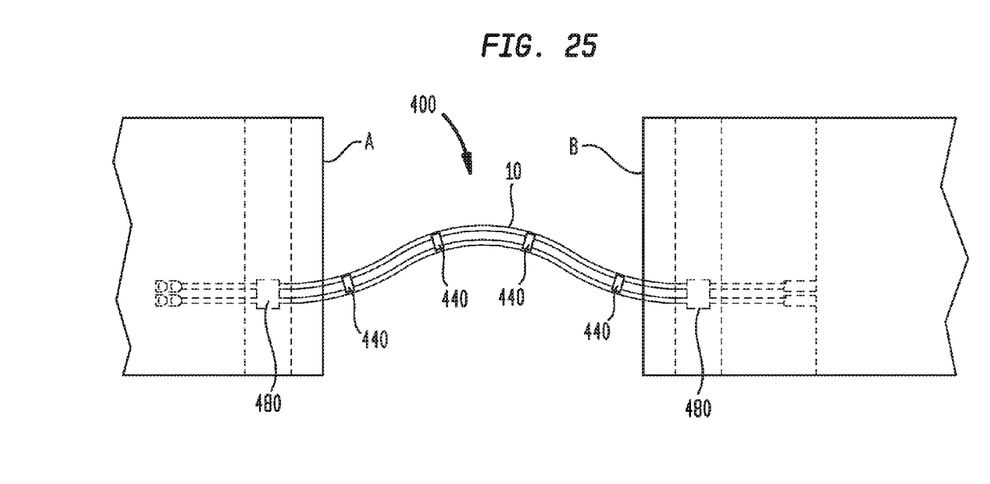

FIGS. 24-25 illustrate top and side views of a suspended cable using a multiple axis control suspension system 400. FIG. 24 illustrates a side view and FIG. 25 illustrates a top view of a conduit system. In this illustration, the distance between terminal A and terminal B may change (shorten and/or lengthen), a length of conduit 10 may be provided which is greater than the starting distance between A and B. It can be seen that provision of multiple axis and control suspension system 400 maintains a large clearance between conduit 10 and foreign objects or surfaces beneath conduit 10, as shown in FIG. 24, by converting downward slack in conduit 10 into a horizontal plane as shown in FIG. 25.

Before continuing, it should be noted that the examples described above are provided for purposes of illustration, and are not intended to be limiting. Other devices and/or device configurations may be utilized to implement the system and method described herein. Still other examples are also contemplated.

By way of illustration, support members may be formed from any of a variety of relatively rigid, durable materials including but not limited to metals, rubbers, plastics, composite materials, or woods. Spines may be formed from any of a variety of durable materials which may demonstrate a single flexibility in all directions or different flexibilities in different directions.

It is also noted that components of an example multiple axis control suspension system may be interchanged with components of another example multiple axis control suspension system in a modular design, thereby allowing for scaling in size, application, or both. The open design of system also allows debris to fall through the cabling, enabling use in harsh or outdoor environments.

A method of supporting a conduit using a multiple axis control suspension system (e.g., system 100 shown and described herein) is also disclosed. In an example method, a conduit (e.g., a wire, cable, or hose) may be supported using the system to change an orientation of a flexible spine, thus allowing control over range of motion and variability of terminal distance without droop or sag. Free spanning gaps of wires, cables, or hoses or other conduits may be separated and deflected to allow freedom of movement.

In an example, a plurality of support members (e.g., support members 140) are provided including at least one passage for at least one spine, and receptacles configured to hold and support one or more conduit, while still enabling motion of the conduit relative to the support members. The spine is arranged through a passage of the support members. One or more conduits may then be positioned in the receptacles of the plurality of support members. Exterior surfaces of the conduit may be held by bushings and/or teeth (and/or other friction reduction members) formed in the receptacles of the support members. The bushings and teeth may serve to reduce friction between the conduit and the support member and reduce wear.

If sleeves or bushings are being used, the conduits may be inserted into lumens of the sleeves. Upon insertion of conduits into the sleeves, exterior surfaces of the conduit may be held more firmly by decreasing the gap size of a longitudinal split in the sleeves, wrapping constraining bands around the sleeves, or both. Constraining bands may engage with annular grooves of the sleeves. The sleeves with conduit may be inserted into receptacles of the support members.

The user can install the conduits into the receptacles of the support member, or feed these through a closed hole in the support member. Then the spine can be fed through the support members to allow some or all of the weight of the conduits to be supported by the spine and hangers. Through-style supports are also provided, wherein the spine can be rotated. Spine rotation with the clamp style support can be achieved by using the through-holes in the support members.

With conduits in the receptacles, the conduits are movably constrained thereto. Bands or ties may be used for additional security. In an example, bands may be provided in circumferential grooves on the support members.

Supports may be provided to suspend the conduits. In an example, hangers are coupled to pins in the one or more of the support members. The spine, in addition to being arranged through the passages in the support members, may also be arranged through transverse bores of the pins. The conduits may be suspended from the top, side(s), and/or bottom by attaching to one or more of the support members and/or the spine.

In an example, spacers may be provided between the support members to increase flexibility in a side-to-side range of motion. In another example, spacers can be pinned along the spine to limit side-to-side motion. Additional support members can be added, and the free space can be used to limit movement.

During use, the flat parallel sided spine feeds through the support members. Because the spine is made of a flexible material, freedom of motion is provided in one axis (e.g., side-to-side), while strength and support is provided in another axis (e.g., up-down direction), thus allowing the user to free-span long gaps without droop or sag. The user can change the direction of axis of control by changing the attaching point of the support member (e.g., by rotating the spine 90 degrees).

Still other examples are also contemplated as being within the scope of the disclosure, as will become readily apparent to those having ordinary skill in the art after becoming familiar with the teachings herein.

The invention claimed is:

1. A multiple axis control suspension apparatus, comprising:
    an elongate spine configured to resist a greater bending moment about a transverse centroidal axis of the elongate spine than about a longitudinal centroidal axis of the elongate spine, and the elongate spine having a substantially rectangular shaped cross section;
    a support member having a passage and at least one through-bore substantially perpendicular to the longitudinal centroidal axis of the elongate spine, the passage having a generally rectangular shaped cross section and extending through the support member to receive the elongate spine so that the elongate spine and the support member are movable relative to one another along the longitudinal centroidal axis of the elongate spine, the at least one through-bore extending completely through the support member, the support member having at least one generally circular shaped opening formed therein to hold at least one conduit, and the support member configured to transfer a force acting on the at least one conduit held by the support member to the elongate spine; and
    a shaft received in the at least one through-bore of the support member, the shaft having a generally cylindrical portion extending substantially perpendicular to the longitudinal centroidal axis of the elongate spine, the generally cylindrical portion having a generally rectangular shaped opening formed therethrough, and the elongate spine received in the generally rectangular shaped opening and extending continuously into the generally rectangular shaped opening at a first open distal end of the generally rectangular shaped opening, laterally through the generally rectangular shaped opening, and out of the generally rectangular shaped opening at a second open distal end of the generally rectangular shaped opening.

2. The multiple axis control suspension apparatus of claim 1, further comprising a conduit sleeve extending through the support member.

3. The multiple axis control suspension apparatus of claim 2, wherein the conduit sleeve has a central lumen and a longitudinal split to adjust a cross section of the central lumen for various sizes of the at least one conduit.

4. The multiple axis control suspension apparatus of claim 1, wherein the support member is generally square shaped.

5. The multiple axis control suspension apparatus of claim 1, wherein the support member is generally oval shaped.

6. The multiple axis control suspension apparatus of claim 1, wherein the support member is generally rectangular shaped.

7. The multiple axis control suspension apparatus of claim 1, further comprising a constraining band configured to surround a perimeter of the support member and the at least one conduit.

8. A multiple axis control suspension system, comprising:
an elongate spine having a greater moment of inertia about a transverse centroidal axis of the elongate spine than about a longitudinal centroidal axis of the elongate spine, and the elongate spine having a substantially rectangular shaped cross section;
at least one support member having a passage and at least one through-bore substantially perpendicular to the longitudinal centroidal axis of the elongate spine, the passage having a substantially rectangular shaped cross section and formed through the at least one support member to receive the elongate spine so that the elongate spine and the at least one support member are movable relative to one another along the longitudinal centroidal axis of the elongate spine, the at least one through-bore extending completely through the at least one support member, and the at least one support member having at least one substantially circular shaped receptacle formed therein to receive at least one conduit and allow a force acting on the at least one conduit to be transferred to the elongate spine; and
a shaft received in the at least one through-bore of the at least one support member, the shaft having a substantially rectangular shaped opening formed therethrough, the shaft having a substantially cylindrical portion extending substantially perpendicular to the longitudinal centroidal axis of the elongate spine, the substantially cylindrical portion having a transverse bore formed therethrough, and the elongate spine received in the substantially rectangular shaped opening and extending continuously into the substantially rectangular shaped opening at a first open distal end of the substantially rectangular shaped opening, laterally through the substantially rectangular shaped opening, and out of the substantially rectangular shaped opening at a second open distal end of the substantially rectangular shaped opening.

9. The multiple axis control suspension system of claim 8, wherein the at least one substantially circular shaped receptacle is open toward an exterior perimeter of the at least one support member.

10. The multiple axis control suspension system of claim 8, wherein the at least one substantially circular shaped receptacle has a plurality of friction-reduction teeth.

11. The multiple axis control suspension system of claim 8, wherein the at least one support member has at least one female member having concave exterior faces, or wherein the at least one support member has at least one male member having convex exterior faces.

12. The multiple axis control suspension system of claim 8, further comprising a band wrapped around a perimeter groove of the at least one support member.

13. The multiple axis control suspension system of claim 8, further comprising a bushing having an outer diameter configured to fit within the at least one substantially circular shaped receptacle and an inner diameter configured to receive the at least one conduit.

14. The multiple axis control suspension system of claim 8, further comprising a bushing configured to receive a plurality of conduits extending through the at least one substantially circular shaped receptacle.

15. The multiple axis control suspension system of claim 14, wherein the bushing is configured to retain the plurality of conduits in a fixed, spaced apart relationship with respect to one another.

16. The multiple axis control suspension system of claim 8, wherein the at least one support member is substantially non-circular shaped.

17. The multiple axis control suspension system of claim 8, wherein the at least one support member is substantially rectangular shaped.

18. The multiple axis control suspension system of claim 8, wherein the at least one support member is substantially square shaped.

19. The multiple axis control suspension system of claim 8, wherein the at least one support member is substantially oval shaped.

* * * * *